(12) United States Patent
Hidaka et al.

(10) Patent No.: US 7,081,960 B2
(45) Date of Patent: Jul. 25, 2006

(54) INTERFEROMETER, EXPOSURE APPARATUS, EXPOSURE METHOD AND INTERFERENCE LENGTH MEASUREMENT METHOD

(75) Inventors: Yasuhiro Hidaka, Kumagaya (JP); Tohru Kawaguchi, Ageo (JP)

(73) Assignee: Nikon Corporation, Tokyo (JP)

( * ) Notice: Subject to any disclaimer, the term of this patent is extended or adjusted under 35 U.S.C. 154(b) by 272 days.

(21) Appl. No.: 10/372,118

(22) Filed: Feb. 25, 2003

(65) Prior Publication Data
US 2003/0223076 A1    Dec. 4, 2003

(30) Foreign Application Priority Data
Feb. 27, 2002    (JP)    ............................. 2002-050617

(51) Int. Cl.
*G01B 11/02* (2006.01)
(52) U.S. Cl. .................................................... 356/498
(58) Field of Classification Search ................ 356/500, 356/486, 487, 493, 498, 509
See application file for complete search history.

(56) References Cited

U.S. PATENT DOCUMENTS 5,541,728 A * 7/1996 Dierking ..................... 356/451
6,046,792 A * 4/2000 Van Der Werf et al. .... 356/500
6,208,424 B1 * 3/2001 de Groot ..................... 356/500
6,252,667 B1 * 6/2001 Hill et al. ..................... 356/500

FOREIGN PATENT DOCUMENTS

JP    A 63-44101    2/1988
JP    A 10-26508    1/1998

* cited by examiner

*Primary Examiner*—Gregory J. Toatley, Jr.
*Assistant Examiner*—Patrick Connolly
(74) *Attorney, Agent, or Firm*—Oliff & Berridge PLC

(57) ABSTRACT

A first polarizing beam splitter splits the light emitted by a light source into a measurement beam and a reference beam. The reference beam is returned by a second polarizing beam splitter and an optical member which is constituted by a right angle prism and a pentaprism, reenters the first polarizing beam splitter via a half wavelength plate and guided to a detector. On the other hand, the measurement beam is reflected by a corner mirror, is returned by the second polarizing beam splitter and the optical member, is reflected by the corner mirror again, reenters the first polarizing beam splitter via a half wavelength plate and guided to the detector. The optical member returns the measurement beam such that the measurement beam exits at the different point from the incident point and that light rays incident thereon in a state shifted from each other are returned with the shifted direction and shifted amount between each light rays kept unchanged.

13 Claims, 10 Drawing Sheets

INTERFEROMETER, EXPOSURE APPARATUS, EXPOSURE METHOD AND INTERFERENCE LENGTH MEASUREMENT METHOD

BACKGROUND OF THE INVENTION

1. Field of the Invention

The present invention relates to an interferometer such as a laser interferometer, an exposure apparatus that employs this interferometer, an exposure method that employs this exposure apparatus and an interference length measurement method.

2. Related Background of the Invention

Batch exposure-type (stepper method) or scanning exposure-type (step and scan method and so forth) exposure apparatuses used for the fabrication of semiconductor devices require a high level of exposure accuracy. For this reason, in an exposure apparatuses, a moving mirror is fixed to the side of a reticle stage on which a reticle as a mask is placed and position of which is controlled or to the side of a wafer stage on which a wafer as a substrate is placed and which moves in two dimensions. A measurement beam is irradiated onto the moving mirror by a laser interferometer or other interferometer, whereby the movement amounts of the stages are successively measured, and it is possible to align the stages highly accurately on the basis of these measured values.

FIG. 9 is a constitutional view of a conventional laser interferometer which is used in order to align the stages of the exposure apparatus. As shown in the figure, a laser beam L which is emitted by a laser light source 100, enters a polarizing beam splitter 102. Two polarized components whose polarizing directions lie orthogonal to each another are mixed in the laser beam L. The component which is polarized perpendicular to the incident plane, that is, the s-polarized light component, is reflected by the polarizing beam splitter 102 and travels toward a fixed mirror 106 via a quarter wavelength plate 104 as a reference beam LR. Interference methods include the heterodyne interference method which allows a small frequency difference between the two polarized components, and the homodyne interference method which does not allow a frequency difference. After being reflected by the fixed mirror 106, the reference beam LR passes through the polarizing beam splitter 102 via the quarter wavelength plate 104 as a p-polarized beam, and then enters a photo-detector 108 that comprises a photo-detector element and a photoelectric conversion element.

Meanwhile, the p-polarized light component of the laser beam L that is polarized parallel to the incident plane passes through the polarizing beam splitter 102 and travels toward a corner mirror 112 (moving mirror) via a quarter wavelength plate 110 as a measurement beam LM. The corner mirror 112 is fixed to a sample object, which is constituted so as to be movable in a direction parallel to the optical path of the measurement beam LM emitted from the polarizing beam splitter 102.

The measurement beam LM is reflected by a first reflection plane 112a and a second reflection plane 112b of the corner mirror 112, and thus travels toward the fixed mirror 106. The measurement beam LM, which is reflected by the fixed mirror 106 and thus caused to travel in the reverse direction, travels toward the corner mirror 112, is reflected by the second reflection plane 112b and the first reflection plane 112a of the corner mirror 112, is reflected by the polarizing beam splitter 102 via the quarter wavelength plate 110 as s-polarized light, and then travels on substantially the same path as the reference beam LR before entering the photo-detector 108. By means of photoelectric conversion of the interference beam obtained from the reference beam LR and the measurement beam LM, the photo-detector 108 generates a counting pulse in accordance with the movement amount of the corner mirror 112 and the movement amount of the corner mirror 112 is measured by adding up the counting pulses.

In this conventional interferometer, even in cases where transverse shift occurs due to oscillation or transverse position change of the corner mirror 112 is required, the optical path of the measurement beam LM that enters the corner mirror 112 from the polarizing beam splitter 102 and the optical path of the measurement beam LM that enters the polarizing beam splitter 102 from the corner mirror 112 can be equalized. In other words, in cases where the corner mirror 112 shifts in position (as indicated by the dot-dash line in FIG. 9), the measurement beam LM' (shown as a broken line in FIG. 9), which is reflected by the first reflection plane 112a and the second reflection plane 112b of the corner mirror 112 before traveling toward the fixed mirror 106 and being reflected by the fixed mirror 106 and the corner mirror 112, enters the polarizing beam splitter 102 via the same optical path as that traveled by the measurement beam in cases where the corner mirror 112 is not shifted in position. An interferometer of this kind is disclosed in Japanese Patent Application Laid open No. 63-44101.

However, as shown in FIG. 10, in a state where the reflection plane of the fixed mirror 106 which reflects the measurement beam LM is tilted relative to the polarizing beam splitter 102, in case where there is a positional shift of the corner mirror 112 (as indicated by the dot-dash line in FIG. 10), a measurement error is generated. That is, as shown in FIG. 11, in case where there is a positional shift of the corner mirror 112 (the optical path is indicated by the broken line, whereas the optical path in case where there is no positional shift of the corner mirror 112 is indicated by the solid line), the position at which the measurement beam LM enters the fixed mirror 106 in case where there is no positional shift of the corner mirror 112 differs from the position at which the measurement beam LM' enters the fixed mirror 106 in case where there is positional shift of the corner mirror 112, thus causing the measurement error.

SUMMARY OF THE INVENTION

It is an objective of this invention to provide an interferometer that does not provoke a transverse shift between the measurement beam and the reference beam, thereby preventing the measurement error, an exposure apparatus that employs this interferometer and an exposure method that employs this exposure apparatus and an interference length measurement method that does not provoke a transverse shift between the measurement beam and the reference beam.

The interferometer of the present invention is an interferometer, comprising: a light source; a beam splitter; and an optical member, wherein the beam splitter splits the light emitted by the light source into a measurement beam and a reference beam, wherein the reference beam is reflected by a fixed reflector (a first reflector); wherein the measurement beam is reflected by a moving mirror (a second reflector), which includes at least two mutually orthogonal reflection planes; further wherein the measurement beam reflected by the moving mirror are returned by the optical member, which returns the incident light such that the incident light exits at the point different from the incident point and that light rays incident thereon in a state shifted from each other are returned with the shifted direction and shifted amount between each light rays kept unchanged; and still wherein the reference beam reflected by the fixed reflector and the measurement beam returned by the optical member via the moving mirror are detected.

Another aspect of the interferometer of the present invention is an interferometer, comprising: a light source; a beam splitter, which is disposed in the optical path of the light emitted by the light source and which splits the light into a measurement beam and a reference beam; a fixed reflector, which is disposed in the optical path of the reference beam; a moving mirror, which is disposed in the optical path of the measurement beam and includes at least two mutually orthogonal reflection planes; and an optical member, which is disposed in the optical path of the measurement beam reflected by the moving mirror and which returns the measurement beam toward the moving mirror in a manner causing the incident measurement beam to be reflected odd number of times before exiting therefrom.

The interference length measurement method of the present invention is an interference length measurement method, comprising; a first step of splitting light emitted by a light source into a measurement beam and a reference beam; a second step of causing the reference beam to be reflected by a fixed reflector; a third step of causing the measurement beam to be reflected by a moving mirror that includes at least two mutually orthogonal reflection planes; a forth step of returning the measurement beam having traveled via the moving mirror by an optical member; and a fifth step of detecting the reference beam reflected by the fixed reflector and the measurement beam returned by the optical member via the moving mirror, wherein, in the forth step, the measurement beam exits from the optical member at the point different from the incident point while the optical member keeping the shifted direction and shifted amount between the incident light rays, incident points of which are shifted from each other, unchanged.

The exposure apparatus of the present invention is an exposure apparatus for transferring a pattern formed on a mask onto a substrate, comprising: a first stage whereon the mask is placed; a second stage whereon the substrate is placed; and one of the above described interferometers according to the present invention, wherein the moving mirror of the interferometer is disposed on at least one of the first stage and the second stage.

The exposure method of the present invention is an exposure method for transferring a pattern formed on a mask onto a substrate, comprising: a first step of measuring position of at least one of the mask and the substrate by using one of the above described interferometers according to the present invention; a second step of illuminating the mask; and a third step of transferring the pattern on the mask onto the substrate.

DESCRIPTION OF THE PREFERRED EMBODIMENTS

Figure 1:
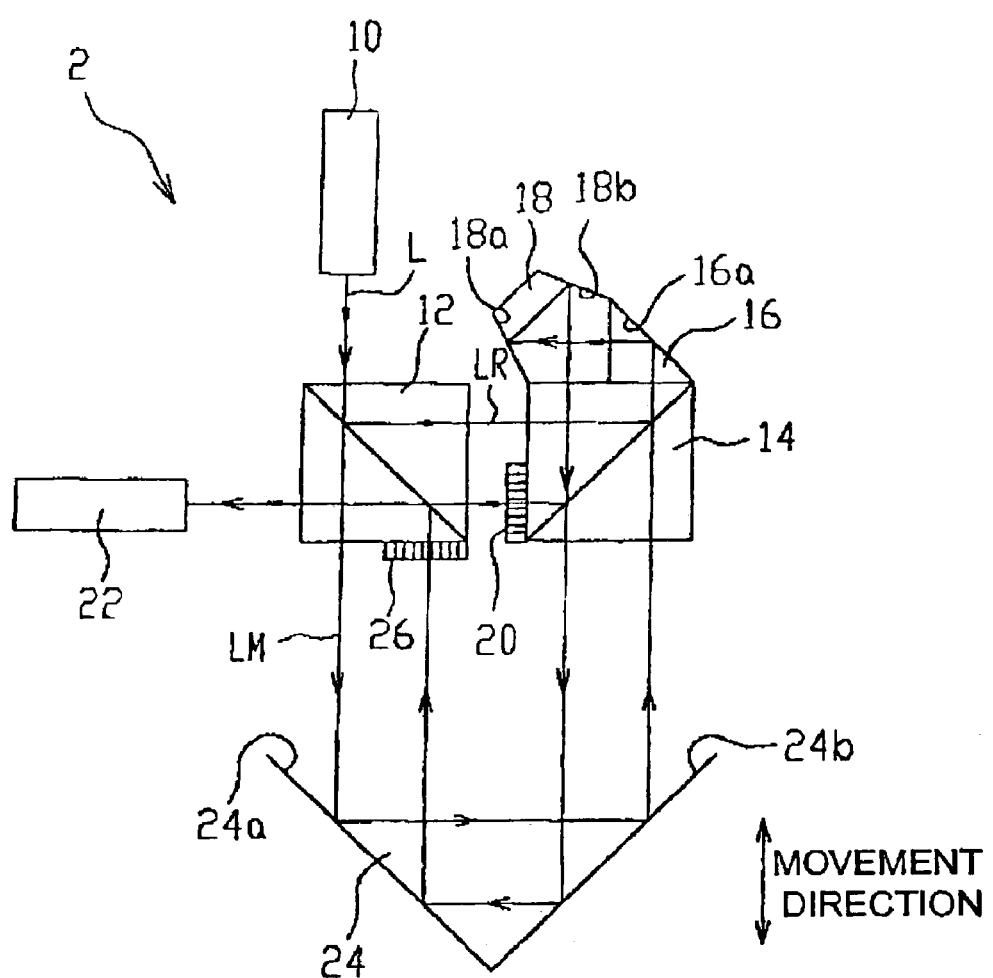
FIG. 1 shows the overall constitution of the laser interferometer according to an embodiment of the present invention.
Figure 2:
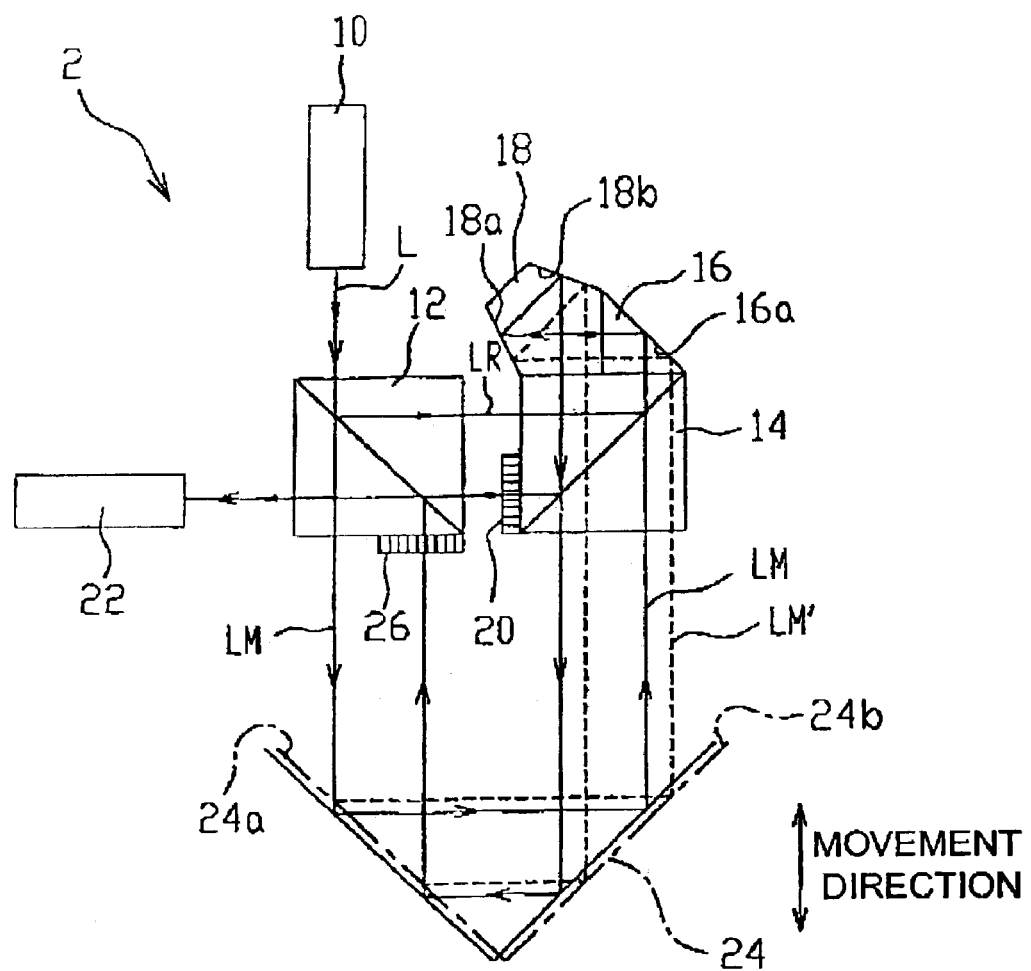
FIG. 2 serves to illustrate the optical path in case where there is a positional shift of the corner mirror in the laser interferometer according to the embodiment of the present invention.

The laser interferometer according to an embodiment of the present invention will be described below with reference to FIGS. 1 and 2. FIG. 1 shows the overall constitution of a laser interferometer 2 according to an embodiment. As shown in the figure, a laser beam L which is emitted by a laser light source 10, enters a first polarizing beam splitter 12. Two polarized components whose polarizing directions lie orthogonal to each another are mixed in the laser beam L. The component which is polarized perpendicular to the incident plane, that is, the s-polarized light component, is reflected by the first polarizing beam splitter 12 and travels toward a second polarizing beam splitter 14 as a reference beam LR.

The reference beam LR, which enters the second polarizing beam splitter 14, is reflected by the second polarizing beam splitter 14 and travels toward the optical member which is constituted by a right angle prism 16 and a pentaprism 18. The reference beam LR, which is reflected by a reflection plane 16a of the right angle prism 16, is reflected by a first reflection plane 18a and a second reflection plane 18b of the pentaprism 18 before entering the second polarizing beam splitter 14 once again. The optical member, which is constituted by the right angle prism 16 and the pentaprism 18, possesses the functions of a fixed mirror (first reflector), and light is emitted after being reflected three times (odd number of times) by the right angle prism 16 and the pentaprism 18.

The reference beam LR, which enters the second polarizing beam splitter 14, is reflected by the second polarizing beam splitter 14, transmitted by the first polarizing beam splitter 12 via a half wavelength plate 20 as p-polarized light, and then enters a photo-detector 22 that comprises a photo-detector and a photoelectric conversion element.

Meanwhile, the p-polarized light component which is in the laser beam L and polarized parallel to the incident plane is transmitted by the first polarizing beam splitter 12 and travels toward a corner mirror 24 (moving mirror, second reflector) as a measurement beam LM. The corner mirror 24 is a moving mirror that comprises at least two or more mutually orthogonal reflection planes and is fixed to a sample object which is constituted so as to be capable of moving in the direction of the arrow.

The measurement beam LM is reflected by a first reflection plane 24a and a second reflection plane 24b of the corner mirror 24, and thus travels toward the second polarizing beam splitter 14. The measurement beam LM, which enters the second polarizing beam splitter 14, is transmitted by the second polarizing beam splitter 14 and thus travels toward the optical member which is constituted by the right angle prism 16 and the pentaprism 18. The measurement beam LM, which is reflected by the reflection plane 16a of the right angle prism 16, is reflected by the first reflection plane 18a and the second reflection plane 18b of the pentaprism 18, before entering the second polarizing beam splitter 14 once again. In other words, the measurement beam LM is reflected three times (odd number of times) by the right angle prism 16 and the pentaprism 18 and then enters the second polarizing beam splitter 14 once again. Additionally, the optical member causes the measurement beam LM to be emitted therefrom at the point different from the incident point, thus forming double optical paths of the incoming measurement beam and outgoing measurement beam.

The measurement beam LM, which enters the second polarizing beam splitter 14, is transmitted by the second polarizing beam splitter 14 and thus travels towards the corner mirror 24. The measurement beam LM is reflected by a second reflection plane 24b and a first reflection plane 24a of the corner mirror 24, and is reflected by the first polarizing beam splitter 12 via a half wavelength plate 26 as s-polarized light, before entering the photo-detector 22 on substantially the same axis as the reference beam LR. By means of photoelectric conversion of the interference beam obtained from the reference beam LR and the measurement beam LM, the photo-detector 22 generates a counting pulse in accordance with the movement amount of the corner mirror 24, and the movement amount of the corner mirror 24 is measured by adding up the counting pulses.

Even in case where there is a positional shift (a transverse shift in a direction at right angles to the movement direction) caused by oscillations of the corner mirror 24 or in case where the transverse position change of the corner mirror 24 is required, the interferometer is capable of setting the optical path of the measurement beam which returns from the corner mirror 24 to the first polarizing beam splitter 12 so that this optical path is the same in case where there is no positional shift of the corner mirror 24.

In other words, in cases where the corner mirror 24 shifts in position (as indicated by the dot-dash line in FIG. 2), the measurement beam LM' (indicated by the broken line in FIG. 2), which is reflected by the first reflection plane 24a and the second reflection plane 24b of the corner mirror 24 and thus travels toward the second polarizing beam splitter 14, enters the second polarizing beam splitter 14 via a path that differs from that traveled by the measurement beam LM (indicated by the solid line in FIG. 2) when there is no positional shift of the corner mirror 24.

Accordingly, the measurement beam LM' enters the right angle prism 16 from a position that is shifted with respect to the position in which the measurement beam LM enters the right angle prism 16. The measurement beam LM' which thus enters the right angle prism 16 is reflected by the reflection plane 16a of the right angle prism 16, and by the first reflection plane 18a and the second reflection plane 18b of the pentaprism 18, before being emitted by the pentaprism 18. In other words, the measurement beam LM' is emitted in a direction which is the reverse of the direction of incidence on the right angle prism 16.

In this case, the measurement beam LM' is emitted from the position that is shifted from the exit position of the measurement beam LM, but the shift between the exit position of the measurement beam LM' and the exit position of the measurement beam LM retains the shift direction and the shift amount between the positions in which the measurement beam LM' and the measurement beam LM enter the right angle prism 16. Therefore, the measurement beam LM', which is reflected by the second reflection plane 24b and the first reflection plane 24a of the corner mirror 24 and thus travels toward the first polarizing beam splitter 12, enters the first polarizing beam splitter 12 via the same optical path as that traveled by the measurement beam LM when there is no positional shift of the corner mirror 24.

Since the optical member which is constituted by the right angle prism 16 and the pentaprism 18 reruns the measurement beam, even in case where the positional shift of the corner mirror 24 occurs in a state the optical member is inclined with respect to the first polarizing beam splitter 12, measurement error due to vertical difference of incidence point from the case where there is no positional shift of the corner mirror 24 can be prevented.

Since the reference beam and the measurement beam are returned by the same optical member, even in case the optical member is inclined with respect to the first polarizing beam splitter 12 as a result of oscillations and the like, the measurement beam and the reference beam enter the photo-detector 22 from the first polarizing beam splitter 12 via the same optical path. In other words, a relative angular displacement between the measurement beam and the reference beam is not provoked and therefore these beams can be guided to the photo-detector 22 in a state in which there is barely any relative transverse shift. It is thus possible to prevent the measurement error and to perform stable measurement.

Furthermore, according to the interferometer of the present embodiment, because the optical member constituted by the right angle prism 16 and the pentaprism 18 possesses the functions of a fixed mirror, there is no need to separately provide a fixed mirror. Further, because the optical member that possesses the functions of a fixed mirror is constituted by the right angle prism 16 and the pentaprism 18, it is possible to increase the maximum permissible amount for the transverse shift of the measurement beam that enters the optical member, thus the maximum permissible amount for the transverse shift of the corner mirror 24 is increased.

Further, in the interferometer of the present embodiment, an optical member that possesses the functions of a fixed mirror is constituted by combining the right angle prism 16 and the pentaprism 18 but an optical member of a similar structure may also be formed as an integral optical member.

Furthermore, the optical member, which is in the interferometer of the present embodiment and constituted by the right angle prism 16 and the pentaprism 18, possesses the functions of a fixed mirror, but a fixed mirror may be provided separately. In such a case, a corner mirror is preferably used as the fixed mirror. Here, the reference beam, which travels along a reference beam path, travels via a pentaprism, right angle prism and fixed mirror. And an optical path is established such that the measurement beam, which travels alone a measurement beam path, travels via a pentaprism, right angle prism and moving mirror. This constitution affords the benefit that the position of the fixed mirror constituting the length measurement reference position can be optionally established, meaning that when the interferometer is applied to a projection exposure apparatus, for example, the stage positions can be measured relative to the projection optical system rather than relative to the interferometer.

Figure 3:
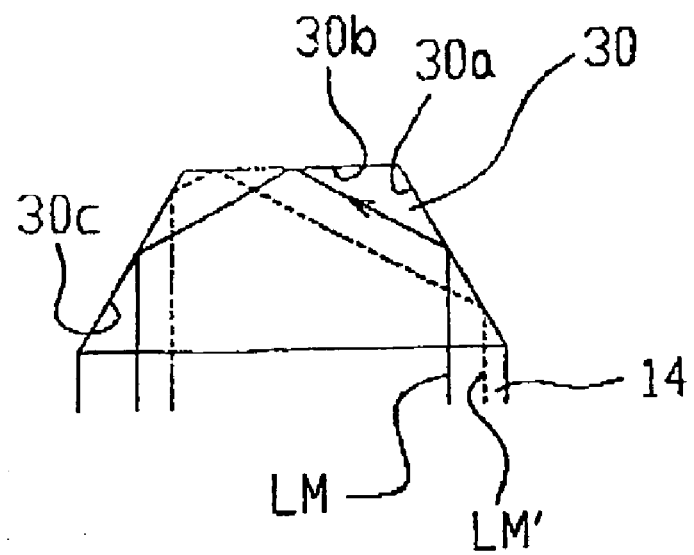
FIG. 3 shows another example or an optical member which is provided in the laser interferometer according to the embodiment of the present invention.
Figure 4:
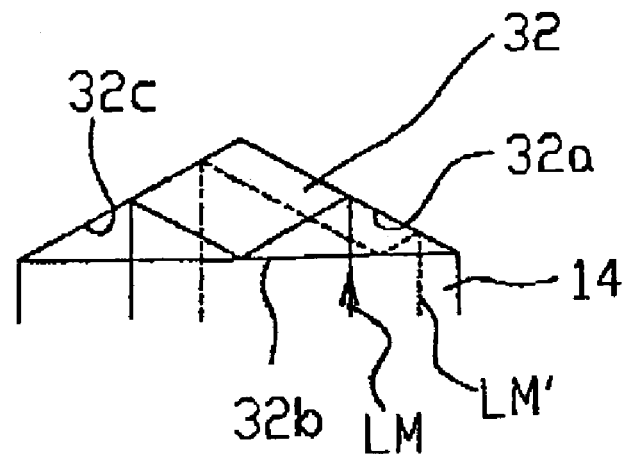
FIG. 4 shows another example of an optical member which is provided in the laser interferometer according to the embodiment of the present invention.

A description follows, with reference to FIGS. 3 and 4, for another example of the optical member according to the embodiment of the present invention that possessed the functions of a fixed mirror.

FIG. 3 shows a trapezoid prism 30 which is used as an optical member that possesses the functions of a fixed mirror. The measurement beam LM, which enters the trapezoid prism 30, is reflected by a first reflection plane 30a, a second reflection plane 30b and a third reflection plane 30c, exits the trapezoid prism 30, and then enters the second polarizing beam splitter 14 once again. When this trapezoid prism 30 is used, in case where there is a shift between the positions in which the measurement beam LM' and the measurement beam LM enter the trapezoid prism 30 on account of a transverse shift of the corner mirror 24, the shift between the exit position of the measurement beam LM' and the exit position of the measurement beam LM retains the shift direction and the shift amount between the positions in which the measurement beam LM' and the measurement beam LM enter the trapezoid prism 30. Accordingly, the measurement beam LM' can be made to enter the first polarizing beam splitter 12 via the same optical path as that traveled by the measurement beam LM when there is no positional shift of the corner mirror 24. As a result, a positional shift (transverse shift) between the reference beam and the measurement beam that enter the photo-detector 22 can be dispensed with and the measurement error of the interferometer can therefore be made extremely small.

FIG. 4 shows a prism 32 which is used as an optical member that possesses the functions of a fixed mirror. The bottom face of the prism 32 which contacts the second polarizing beam splitter 14 is such that, in the position in which the measurement beam enters the prism 32 from the second polarizing beam splitter 14, a transmittance face is formed and, as a result of providing a reflective membrane in the position in which light from a first reflection plane 32a of the prism 32 enters, this section of the bottom face is formed as a second reflection plane 32b. The measurement beam LM, which enters the prism 32, is reflected by the first reflection plane 32a, the second reflection plane 32b and a third reflection plane 32c, is caused to exit the prism 32 and then enters the second polarizing beam splitter 14. Therefore, when the prism 32 is used, the measurement beam LM' can be made to enter the first polarizing beam splitter 12 via the same optical path as that traveled by the measurement beam LM when there is no positional shift of the corner mirror 24. As a result, a positional shift (transverse shift) between the reference beam and the measurement beam that enter the photo-detector 22 can be dispensed with and the measurement error of the interferometer can therefore be made extremely small.

In the interferometer according to the above-described embodiment and example, a corner mirror that comprises three mutually orthogonal reflection planes or two mutually orthogonal reflection planes can be applied. In the above description, a case of using a corner mirror comprising two mutually orthogonal reflection planes was described but the effects of the present invention are afforded also in case where a corner mirror that comprises three mutually orthogonal reflection planes, that is, a solid body structure, is applied.

Figure 5:
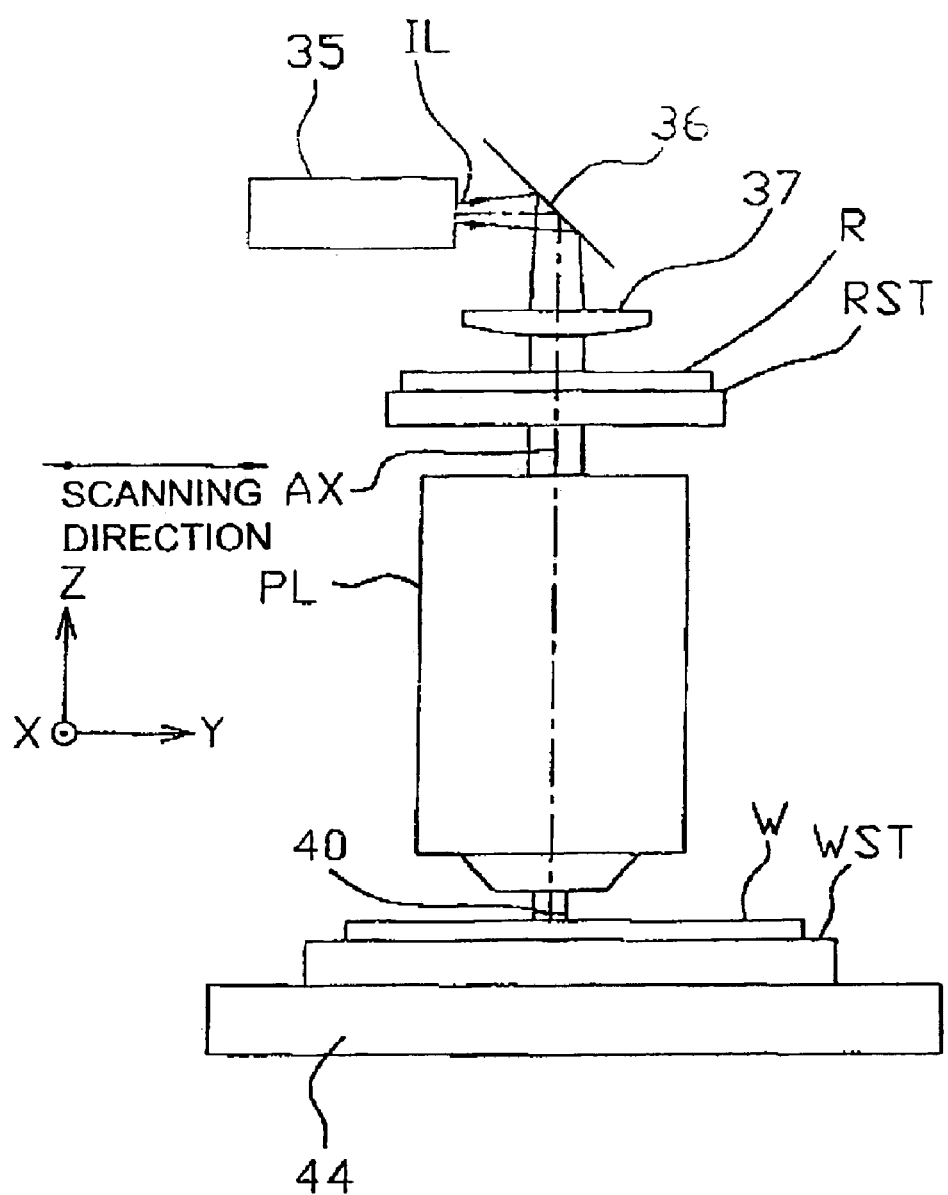
FIG. 5 shows the constitution of a projection exposure apparatus used in the step and scan method according to the embodiment of the present invention.

A description will be provided next for a projection exposure apparatus of the step and scan method, according to the embodiment of the present invention. FIG. 5 shows the constitution of this projection exposure apparatus. During exposure, the projection exposure apparatus shown in FIG. 5 illuminates a slit-like illumination area of the pattern face (lower face) of a reticle R via a mirror 36 and a condenser lens 37 with exposure light IL which is emitted by an illumination system 35 that comprises an exposure light source, a beam shaping optical system, an illuminance distribution equalizing fly's eye lens, a light amount monitor, a variable opening aperture, a field of view aperture, and a relay lens system, and the like. As the exposure light IL, excimer laser light such as KrF (wavelength 248 nm) excimer laser light or ArF (wavelength 193 nm) excimer laser light, or a YAG laser harmonic or mercury lamp i line (wavelength 365 nm), and the like, can be employed. A constitution is possible in which, by switching the variable opening aperture in the illumination system 35, the desired illumination method can be selected from an ordinary illumination method, annular illumination, so-called modified illumination, and small coherence factor ($\sigma$ value) illumination, and so forth. In cases where the exposure light source is a laser light source, the emission timing and so forth is controlled via a laser power supply (not shown) of a main control system (not shown) that performs overall control of the operation of the whole apparatus.

The pattern in the illumination area of the reticle R produced by the exposure light IL is reduced via a projection optical system PL with a projection magnification $\beta$ (where $\beta$ signifies ¼ magnification, or ⅕ magnification, or the like), and then projected onto a slit-like exposure area 40 on the wafer W whereon a photoresist is applied. A description is provided below by adopting a Z axis that runs parallel to the optical axis AX of the projection optical system PL, an X axis which is in a plane perpendicular to the Z axis, and which follows a non-scanning direction (that is, a direction perpendicular to the bottom face in FIG. 5) that lies orthogonal to the scanning direction of the wafer W and the reticle R during scanning exposure, and a Y axis which follows the scanning direction (that is, a direction parallel with the bottom face in FIG. 5).

Figure 6:
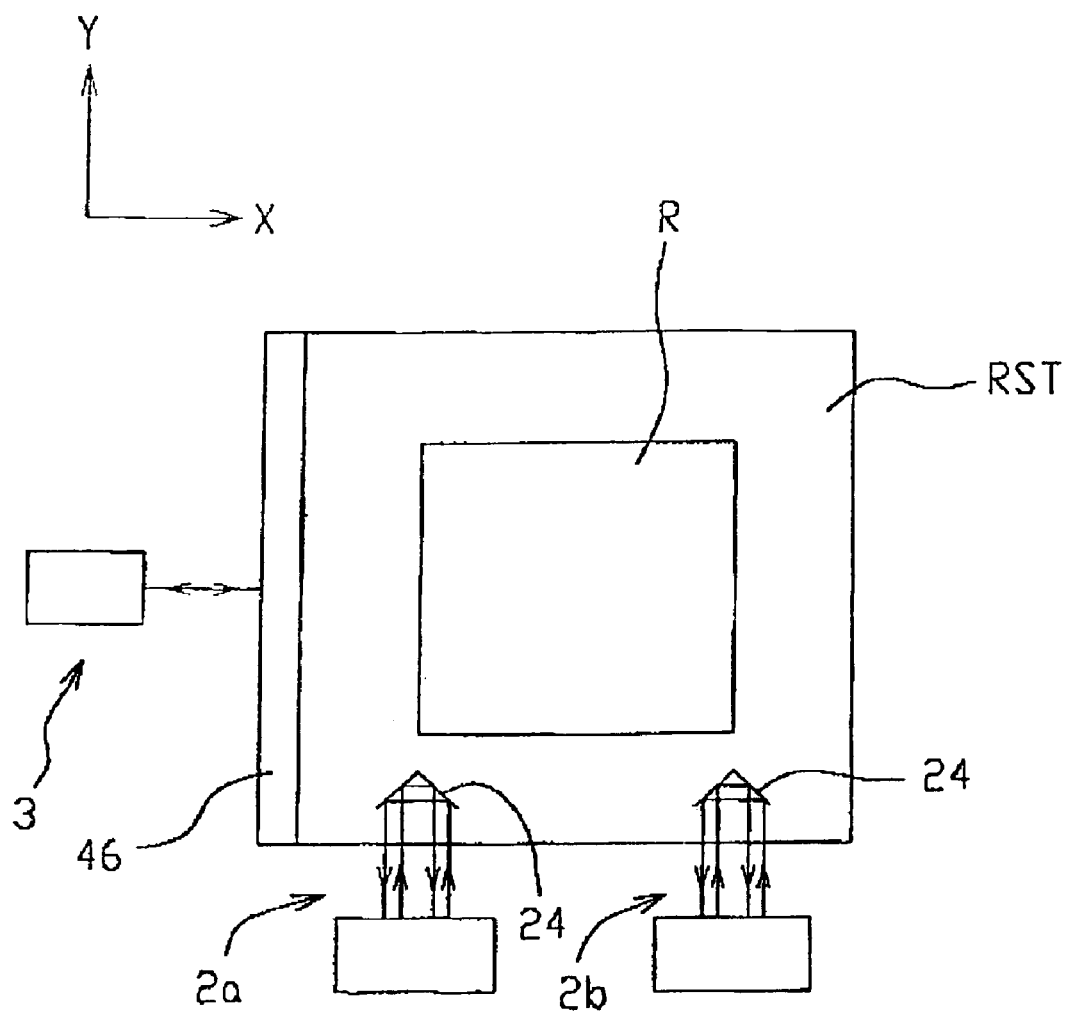
FIG. 6 is a planar view showing the reticle stage of the projection exposure apparatus according to the embodiment of the present invention.

The reticle R is retained by vacuum adsorption on the reticle stage RST. FIG. 6 is a planar view of the reticle stage RST. As shown in FIG. 6, two laser interferometers 2a and 2b are mounted on the reticle stage RST in the direction of Y axis, and a laser interferometer 3 is mounted in the direction of X axis. The laser interferometers 2a and 2b have a constitution which is the same as that of the interferometer 2 shown in FIG. 1. Further, the laser interferometer 3 detects positions in the X directions of the reticle stage RST by irradiating laser light onto a moving mirror 46 which is mounted on the side of the reticle stage RST which lies in the direction of X axis.

The X and Y co-ordinates, and the angle of rotation of the reticle stage RST are measured by the laser interferometers 2a, 2b, and 3, and these measurement values are supplied to the main control system, whereupon the main control system controls the speed of movement, as well as the position of the reticle stage RST on the basis of these measurement values.

Further, similarly to the reticle stage RST, the wafer stage WST for holding the wafer W is provided with laser interferometers (not shown) for measuring the X and Y co-ordinates and the angle of rotation. The X and Y co-ordinates and the angle of rotation of the wafer stage WST are measured by these laser interferometers, and these measurement values are supplied to the main control system, whereupon the main control system controls the speed of movement, as well as the position of the wafer stage WST on the basis of these measurement values.

The projection exposure apparatus according to the present embodiment is capable of measuring positions in the scanning direction of the reticle stage RST extremely accurately by means of the laser interferometers 2a and 2b. Therefore, the transfer pattern formed on the reticle R can be superimposed on the wafer W extremely accurately.

A description will be provided below of a fabrication method for a semiconductor device which is a micro device, which method uses the projection exposure apparatus shown in FIG. 5 to form a predetermined circuit pattern on a wafer which is a photosensitive substrate, or the like, with reference to the flowchart in FIG. 7.

Figure 7:
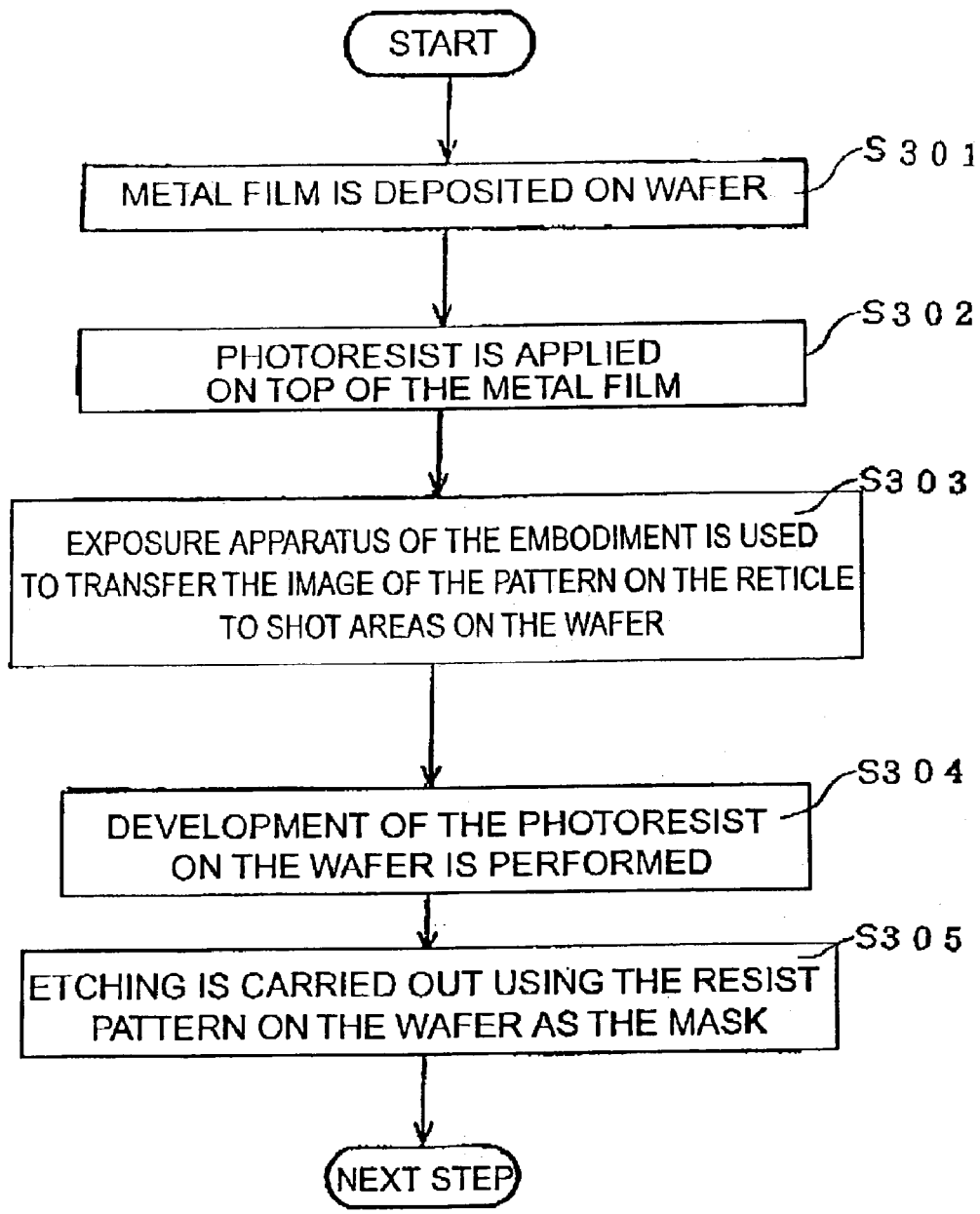
FIG. 7 is a flowchart serving to illustrate the fabrication method of a micro device according to the embodiment of the present invention.

First of all, a metal film is deposited on one lot of wafers in step S301 of FIG. 7. In step S302 which follows, a photoresist is applied on top of the metal film on this single lot of wafers. Thereafter, in step S303, the projection exposure apparatus shown in FIG. 5 is used to transfer the image of the pattern on the mask, by means of sequential exposure, to shot areas on this single lot of wafers via the projection optical system (projection optical module).

In other words, the positions of the reticle stage RST and the wafer stage WST are measured by means of the interferometers 2a, 2b, and 3, the transfer pattern on the mask (reticle) is illuminated by the illumination optical system (35, 36, 37), and the image of the transfer pattern is transferred by means of exposure as a result of being projected onto the wafer (substrate) via the projection optical system PL.

Thereafter, after development of the photoresist on the single lot of wafers has taken place in step S304, etching is performed in step S305 using the resist pattern on the single lot of wafers as the mask, and, consequently, the circuit pattern which corresponds to the pattern on the mask is formed in shot areas on the wafers. Thereafter, a semiconductor element or other device is fabricated as a result of also forming upper-layer circuit patterns, and so forth. According to the above-described semiconductor device fabrication method, semiconductor devices that have extremely intricate circuit patterns can be obtained with a favorable throughput.

Figure 8:
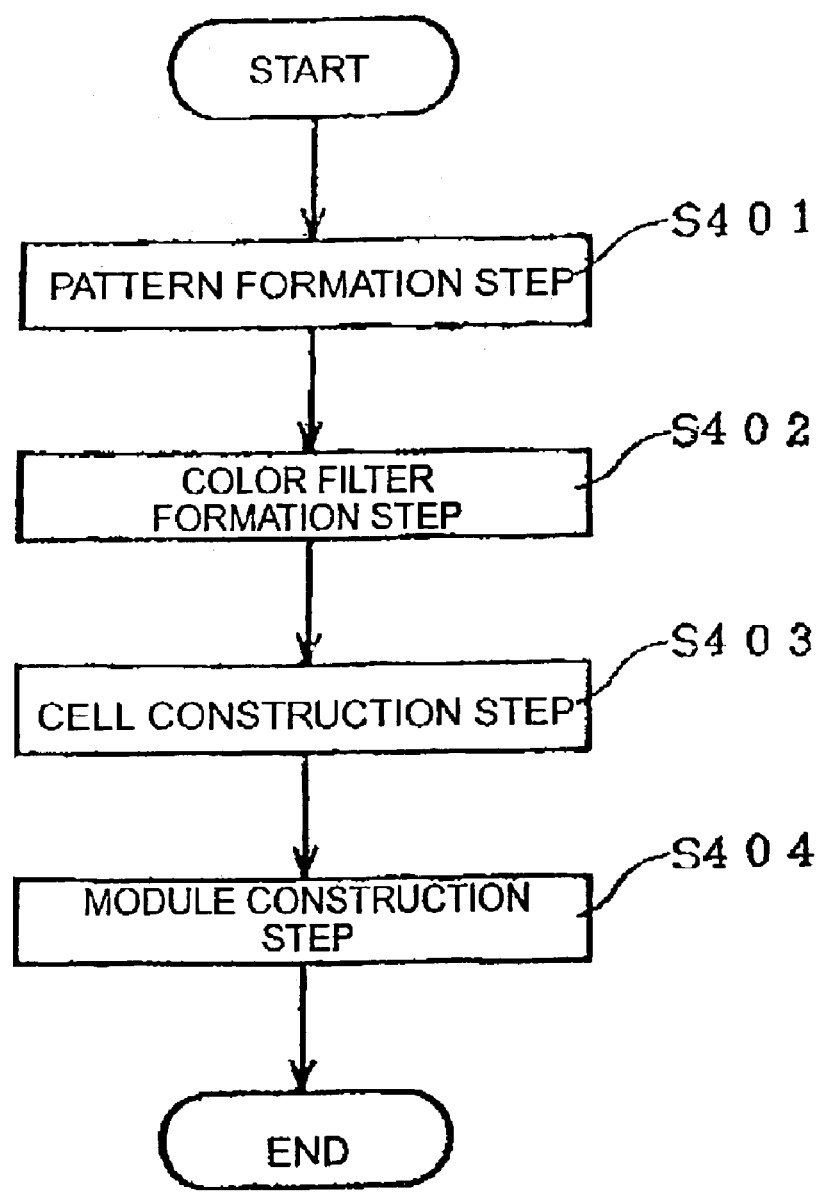
FIG. 8 is a flowchart serving to illustrate the fabrication method of a micro device according to the embodiment of the present invention.
Figure 9:
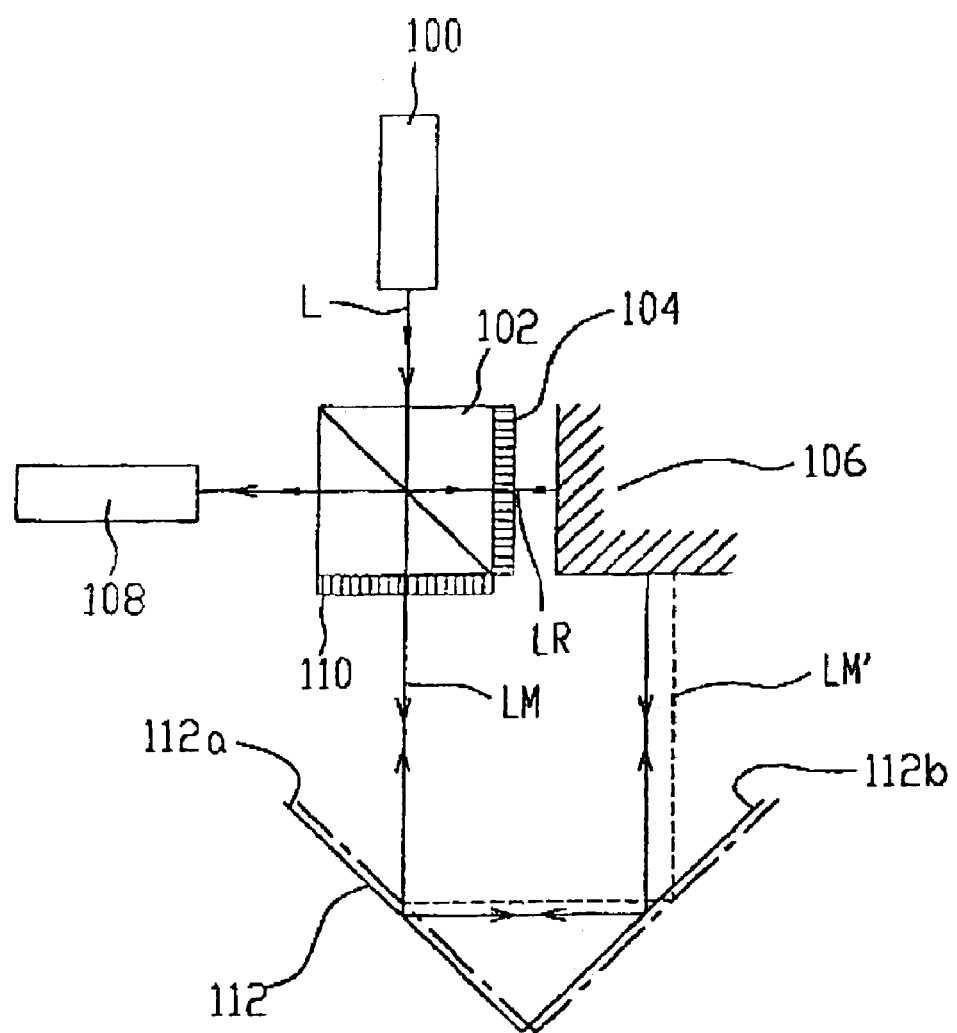
FIG. 9 is a constitutional view of a conventional laser interferometer.
Figure 10:
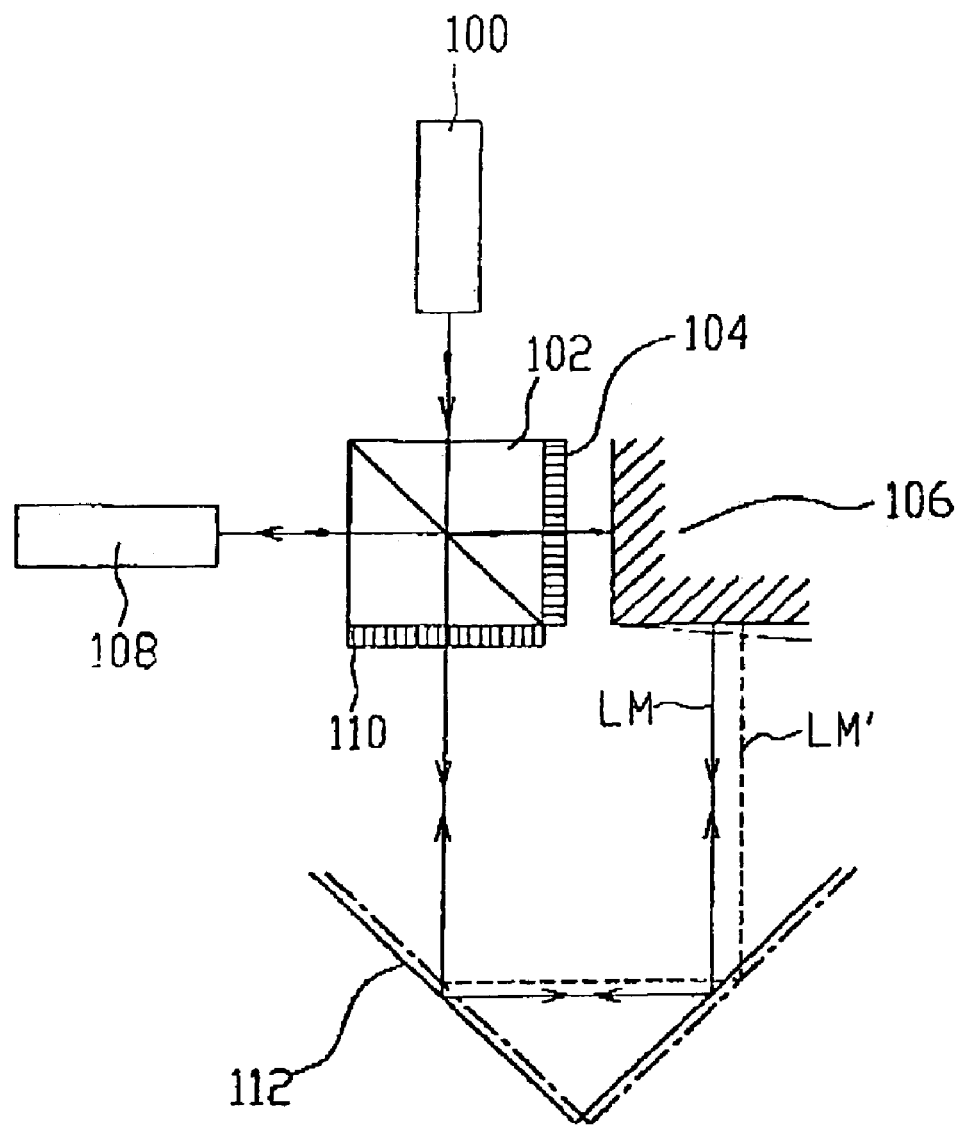
FIG. 10 serves to illustrate a case where a measurement error is generated in the conventional laser interferometer.
Figure 11:
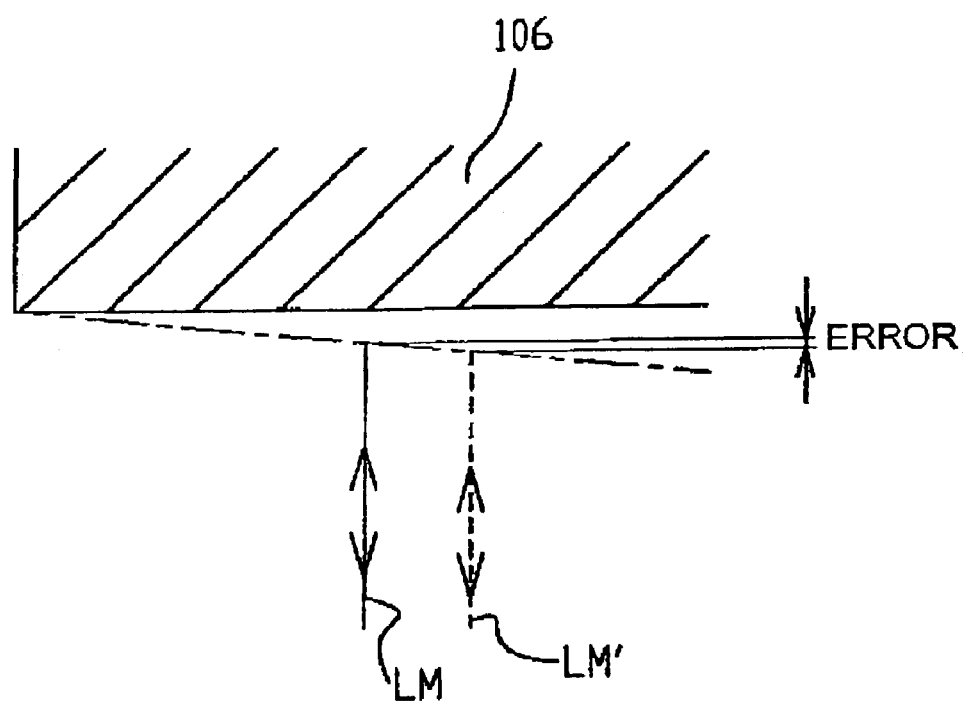
FIG. 11 serves to illustrate in detail the case where a measurement error is generated in the conventional laser interferometer.

Further, the projection exposure apparatus shown in FIG. 5 is also capable of obtaining a liquid crystal display device which is a micro device by forming predetermined patterns (circuit patterns, electrode patterns, and so forth) on a plate (glass substrate). The fabrication method for a liquid crystal display device will be described below with reference to the flowchart in FIG. 8. In FIG. 8, in the pattern formation step S401, a so-called photolithography process is executed in which the mask pattern is exposed so as to be transferred to a photosensitive substrate (a glass substrate to which a resist has been applied, or similar) using the projection exposure apparatus shown in FIG. 5. A predetermined pattern that includes a multiplicity of electrodes and the like is formed on the photosensitive substrate by means of this photolithography process. Thereafter, the exposed substrate is subjected to a development step, an etching step, and a reticle peeling step, and other steps, whereby a predetermined pattern is formed on the substrate, and processing then proceeds to the color filter formation step S402 which follows.

Next, in the color filter formation step S402, color filters, for which a multiplicity of sets of three dots which correspond to R (Red), G (Green), and B (Blue) are arranged in the form of a matrix, or a plurality of filter sets constituted by three stripes R, G, and B are arranged in a horizontal scanning line direction. Then, following the color filter formation step S402, a cell construction step S403 is executed. The cell construction step S403 constructs a liquid crystal panel (liquid crystal cell) by using substrates comprising a predetermined pattern which are obtained in the pattern formation step S401, color filters which are obtained in the color filter formation step S402, and the like. In the cell construction step S403, a liquid crystal panel (liquid crystal cell) is fabricated by injecting liquid crystals between the substrates comprising a predetermined pattern which are obtained in the pattern formation step S401 and the color filters which are obtained in the color filter formation step S402, for example.

Thereafter, in a module construction step S404, fabrication of the liquid crystal display device is completed by attaching parts that carry out the display operation of the constructed liquid crystal panel (liquid crystal cell), such as an electric circuit, a backlight, and the like. According to the above-described fabrication method of the liquid crystal display device, liquid crystal display devices that have extremely intricate circuit patterns can be obtained with a favorable throughput.

According to the interferometer of the present invention, because even in case where there is a positional shift of the moving mirror in a state in which the optical member is inclined, the measurement beam and the reference beam are transmitted by the optical member and guided to the photodetector, the measurement beam and the reference beam travel along the same optical path, that is, the measurement beam and the reference beam can be guided to the photodetector without there being a transverse shift of the measurement beam and the reference beam, whereby the measurement error can be made extremely small.

In addition, in case where the optical member that possesses the functions of a fixed mirror is constituted by a pentaprism and a right angle prism, it is possible to increase the maximum permissible amount for a transverse shift of the measurement beam that enters the optical member.

Further, in cases where the fixed mirror is provided separately from the optical member, the position of the fixed mirror constituting the length measurement reference position can be optionally established, meaning that in a projection exposure apparatus application, for example, the stage positions can be measured relative to the projection optical system rather than relative to the interferometer, which permits a large amount of freedom in the design.

In addition, according to the exposure apparatus of the present invention, the position of at least one of the reticle stage and the substrate stage can be measured extremely accurately, and therefore exposure is possible such that the image of the transfer pattern formed on the reticle is superimposed on the substrate extremely accurately.

Furthermore, according to the exposure method of the present invention, the image of the transfer pattern formed on the reticle can be faithfully formed on the substrate and hence the fabrication of micro devices and the like can be performed with a favorable throughput.

What is claimed is:

1. An interferometer, comprising:
   a light source;
   a beam splitter disposed in an optical path of light emitted by the light source and that splits the light emitted by the light source into a measurement beam and a reference beam;
   a fixed reflector disposed in an optical path of the reference beam and that reflects the reference beam;
   a moving mirror disposed in an optical path of the measurement beam and that includes at least two mutually orthogonal reflection planes; and
   an optical member disposed in the optical path of the measurement beam reflected by the moving mirror and that returns the measurement beam that has been reflected by the moving mirror back toward the moving mirror, wherein the measurement beam exits from the optical member at an exit point different from an incident point where the measurement beam entered the optical member, and when the incident point changes, the optical member causes the exit point to change by a same direction and amount.

2. The interferometer according to claim 1, wherein the incident light is reflected an odd number of times by the optical member before traveling back toward the moving mirror.

3. The interferometer according to claim 2, wherein the optical member comprises a pentaprism and a right angle prism.

4. The interferometer according to claim 3, wherein the optical member also functions as the fixed reflector.

5. The interferometer according to claim 1, wherein the optical member also functions as the fixed reflector.

6. The interferometer according to claim 1, wherein the measurement beam forms a first optical path between the beam splitter and the optical member before entering the optical member, and a second optical path, different from the first optical path, between the optical member and the beam splitter after exiting the optical member.

7. An exposure apparatus for transferring a pattern formed on a mask onto a substrate, comprising: a first stage on which the mask is placed; a second stage on which the substrate is placed; and the interferometer according to claim 1,
   wherein the moving mirror of the interferometer is disposed on at least one of the first stage and the second stage.

8. An exposure method for transferring a pattern formed on a mask onto a substrate, comprising:
   a first step of measuring a position of at least one of the mask and the substrate by using the interferometer according to claim 1;
   a second step of illuminating the mask; and
   a third step of transferring the pattern on the mask onto the substrate.

9. An interference length measurement method, comprising:
   a first step of splitting light emitted by a light source into a measurement beam and a reference beam;
   a second step of causing the reference beam to be reflected by a fixed reflector;
   a third step of causing the measurement beam to be reflected by a moving mirror that includes at least two mutually orthogonal reflection planes;
   a fourth step of returning the measurement beam that has been reflected by the moving mirror back toward the moving mirror by an optical member; and
   a fifth step of detecting the reference beam reflected by the fixed reflector and the measurement beam reflected again by the moving mirror after having been returned to the moving mirror by the optical member,
   wherein, in the fourth step, the measurement beam exits from the optical member at an exit point different from an incident point where the measurement beam entered the optical member, and when the incident point changes, the optical member causes the exit point to change by a same direction and amount.

10. The interference length measurement method according to claim 9, wherein
    in the fourth step, the measurement beam is reflected an odd number of times by the optical member before traveling back toward the moving mirror.

11. The interference length measurement method according to claim 9, wherein
    the second step comprises a step of causing the reference beam to be reflected by a corner mirror.

12. The interference length measurement method according to claim 11, wherein
    the second step comprises a step of causing the reference beam to travel via a pentaprism and a right angle prism.

13. The interference length measurement method according to claim 12, wherein
    the reference beam travels via the pentaprism, the right angle prism and the fixed reflector; and
    the measurement beam travels via the pentaprism, the right angle prism and the moving mirror.

* * * * *